US012617965B2

(12) United States Patent
Wang

(10) Patent No.: US 12,617,965 B2
(45) Date of Patent: May 5, 2026

(54) QUANTUM DOT INK, QUANTUM DOT FILM, PREPARATION METHOD THEREOF AND DISPLAY SUBSTRATE

(71) Applicants: Beijing BOE Technology Development Co., Ltd., Beijing (CN); BOE Technology Group Co., Ltd., Beijing (CN)

(72) Inventor: Tieshi Wang, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 865 days.

(21) Appl. No.: 17/794,684

(22) PCT Filed: Aug. 20, 2021

(86) PCT No.: PCT/CN2021/113902
§ 371 (c)(1),
(2) Date: Jul. 22, 2022

(87) PCT Pub. No.: WO2023/019593
PCT Pub. Date: Feb. 23, 2023

(65) Prior Publication Data
US 2024/0209228 A1 Jun. 27, 2024

(51) Int. Cl.
*C09D 11/38* (2014.01)
*C09K 11/02* (2006.01)
*C09K 11/06* (2006.01)

(52) U.S. Cl.
CPC .............. *C09D 11/38* (2013.01); *C09K 11/02* (2013.01); *C09K 11/06* (2013.01); *C09K 2211/1022* (2013.01)

(58) Field of Classification Search
None
See application file for complete search history.

(56) References Cited

U.S. PATENT DOCUMENTS

2007/0298006 A1 12/2007 Tomalia et al.
2009/0196826 A1 8/2009 Gao et al.
(Continued)

FOREIGN PATENT DOCUMENTS

CN 106206965 A 12/2016
CN 108329469 A 7/2018
(Continued)

OTHER PUBLICATIONS

Fuhua, Liu et al., "Preparation and Modification of Quantum Dots", http: //www.hxtb.org, Chemical Bulletin, vol. 76, Issue 9, Sep. 18, 2013, p. 57-62; w/English translation; Cited in CN Office Action dated Jun. 10, 2023. (14 pages).
(Continued)

*Primary Examiner* — Anthony J Frost
(74) *Attorney, Agent, or Firm* — WHDA, LLP

(57) ABSTRACT

A quantum dot ink, a quantum dot film, a preparation method thereof and a display substrate are provided in the present disclosure, which relates to a technical field of displaying. The quantum dot ink includes: a first ink including at least a quantum dot body and a ligand coordinated on a surface of the quantum dot body, the ligand including an R1 group; and a second ink including at least a reactive compound, the reactive compound being configured for being capable of interacting with the R1 group and cause the quantum dot body to deposit to form a film. The quantum dot film prepared by the quantum dot ink has good film-forming uniformity, thus improving display effect of the display product prepared by the quantum dot film.

18 Claims, 2 Drawing Sheets

(56) References Cited

U.S. PATENT DOCUMENTS

| | | | | |
|---|---|---|---|---|
| 2010/0071590 | A1* | 3/2010 | Kazmaier | C09D 11/34 106/31.62 |
| 2011/0226995 | A1* | 9/2011 | Tulsky | B82Y 15/00 252/301.36 |
| 2014/0354742 | A1* | 12/2014 | Mayo | C09D 11/38 347/102 |
| 2018/0079868 | A1 | 3/2018 | Yamada et al. | |
| 2020/0326597 | A1 | 10/2020 | Rogojina et al. | |
| 2021/0163771 | A1* | 6/2021 | Haben | C01B 25/08 |

FOREIGN PATENT DOCUMENTS

| | | | | |
|---|---|---|---|---|
| CN | 109181414 | A | 1/2019 | |
| CN | 111117357 | A | 5/2020 | |
| CN | 111512452 | A | 8/2020 | |
| EP | 2166047 | A1 | 3/2010 | |
| WO | 2019114829 | A1 | 6/2019 | |
| WO | WO-2019203240 | A1 * | 10/2019 | C01B 25/08 |

OTHER PUBLICATIONS

Hanjun, Zou et al., "Fluorescent Quantum Dots and their Application in Biological Detection", http: //www.hxtb.org, Chemical Bulletin, vol. 75, Issue 3, Mar. 31, 2012, p. 209-215; w/English Translation; Cited in CN Office Action dated Jun. 10, 2023. (16 pages).

Han, Ting et al., "Colloidal stable quantum dots modified by dual functional group polymers for inkjet printing", Journal of Materials Chemistry C, vol. 5, Issue 19, May 21, 2017, p. 4629-4635; Cited in CN Office Action dated Jun. 10, 2023. (8 pages).

Office Action dated Jun. 10, 2023, issued in counterpart CN Application No. 202180002236.7, with English Translation. (18 pages).

* cited by examiner

QUANTUM DOT INK, QUANTUM DOT FILM, PREPARATION METHOD THEREOF AND DISPLAY SUBSTRATE

TECHNICAL FIELD

The disclosure relates to a technical field of displaying, and more particularly, to a quantum dot ink, a quantum dot film, a preparation method thereof and a display substrate.

BACKGROUND

A QD (Quantum Dot) is a new type of nanomaterial, with a crystal diameter between 2 and 20 nanometers, and it can emit monochromatic light with a concentrated energy spectrum and high quality after being excited. By applying quantum dot technologies to a display product, displaying with a wider color gamut can be achieved and a precise color control can be realized.

Currently, quantum dot inks are used to form films by ink-jet printing in display products. However, during drying and forming of the films, the quantum dot inks are prone to Marangoni effect, coffee-ring effect or climbing phenomenon, resulting in poor film-forming uniformity of the quantum dot films, thus reducing display effect of the display products made of the quantum dot films.

SUMMARY

Embodiments of the disclosure incorporate following technical schemes.

In an aspect, a quantum dot ink is provided in an embodiment of the present disclosure, comprising:

- a first ink including at least a quantum dot body and a ligand coordinated on a surface of the quantum dot body, the ligand including an R1 group; and
- a second ink including at least a reactive compound, the reactive compound being configured for being capable of interacting with the R1 group and cause the quantum dot body to deposit to form a film.

In some embodiments, the first ink further includes a first solvent and the second ink further includes a second solvent; wherein

- a product after interaction between the reactive compound and the R1 group is coordinated on the quantum dot body, and the product is insoluble in the first solvent and the second solvent.

In some embodiments, a molecular weight of the product is larger than a molecular weight of the reactive compound.

In some embodiments, a polarity of the product is different from a polarity of the first solvent, and the polarity of the product is further different from a polarity of the second solvent.

In some embodiments, interaction between the reactive compound and the R1 group includes one of cross-linking reaction, electrostatic adsorption and hydrogen bonding.

In some embodiments, the polarity of the first solvent is different from the polarity of the second solvent.

In some embodiments, the R1 group includes a group with a sulfhydryl group or a group with an amino group.

In some embodiments, the reactive compound includes a polymaleimide compound or polysuccinimide compound.

In some embodiments, the polymaleimide compound includes a bismaleimide compound or a trimaleimide compound; and

- the polysuccinimide compound include a bissuccinimide compound or a trisuccinimide compound.

In some embodiments, the bismaleimide compound includes:

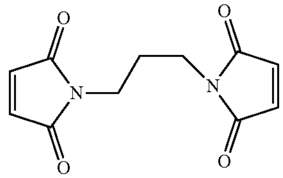
,

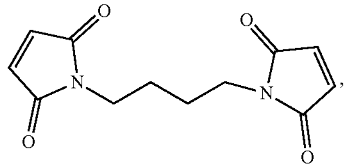
,

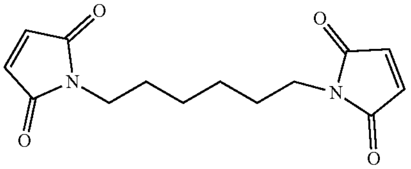
,

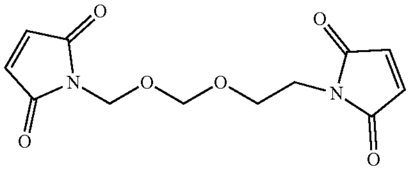
or

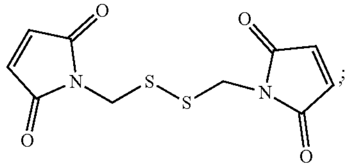
;

the trimaleimide compound includes:

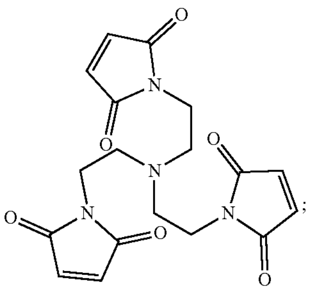 [SMILES: O=C1C=CC(=O)N1CCN(CCN1C(=O)C=CC1=O)CCN1C(=O)C=CC1=O]
;

the bissuccinimide compound includes:

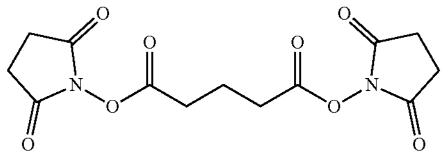
,

-continued

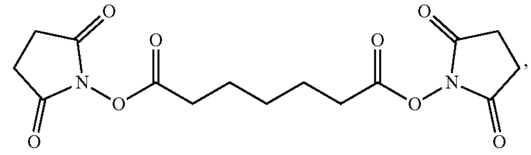

,

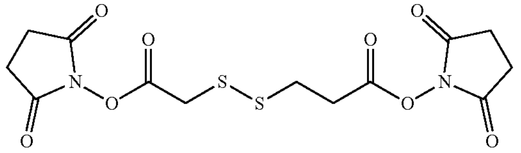

or

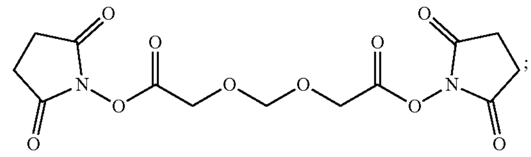

;

and the trisuccinimide compound includes:

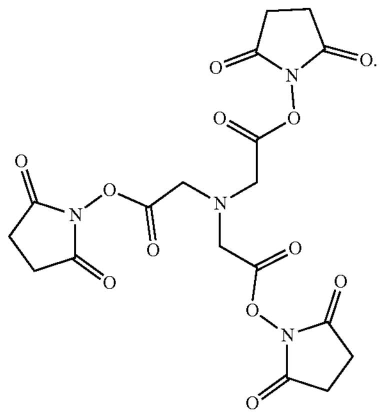 [SMILES: O=C(CN(CC(=O)ON1C(=O)CCC1=O)CC(=O)ON1C(=O)CCC1=O)ON1C(=O)CCC1=O]

In some embodiments, when the R1 group includes a group with a sulfhydryl group, the reactive compound includes a polymaleimide compound, and the solvent of the second ink includes acetone, chloroform toluene and N-methylpyrrolidone; and when the R1 group includes a group with an amino group, the reactive compound includes a polysuccinimide compound, and the solvent of the second ink includes diethylene glycol, triethylene glycol, diethylene glycol dimethyl ether, dimethyl sulfoxide and dimethylformamide.

In another aspect, a quantum dot film is further provided in an embodiment of the present disclosure, comprising the quantum dot body in the quantum dot ink described above, and a product after interaction between the R1 group and the reactive compound, the product being coordinated on at least a part of the quantum dot body.

In some embodiments, quantum dot film further comprises the reactive compound and the ligand coordinated on the surface of the quantum dot body.

In some embodiments, the product coordinated on the quantum dot body includes:

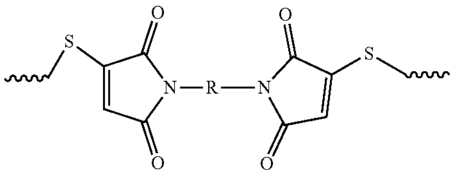

or

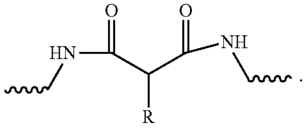

In another aspect, the present disclosure further provides a display substrate, comprising the quantum dot film described above.

In yet another aspect, the present disclosure further provides a method for preparing a quantum dot film, comprising:

providing a substrate;

spraying a first ink on the substrate, the first ink including at least a quantum dot body and a ligand coordinated on a surface of the quantum dot body, the ligand including an R1 group;

spraying a second ink on the substrate, the second ink including at least a reactive compound and the reactive compound being configured for being capable of interacting with the R1 group and cause the quantum dot body to deposit to form the film;

standing for a predetermined time; and carrying out drying treatment.

In some embodiments, the first ink further includes a first solvent and the second ink further includes a second solvent; wherein a product after interaction between the reactive compound and the R1 group is coordinated on the quantum dot body, and the product is insoluble in the first solvent and the second solvent.

In some embodiments, a molecular weight of the product is larger than a molecular weight of the reactive compound.

In some embodiments, a polarity of the product is different from a polarity of the first solvent, and the polarity of the product is further different from a polarity of the second solvent.

In some embodiments, interaction between the reactive compound and the R1 group includes one of cross-linking reaction, electrostatic adsorption and hydrogen bonding.

In some embodiments, the polarity of the first solvent is different from the polarity of the second solvent.

The above description is only a summary of technical schemes of the present disclosure, which can be implemented according to contents of the specification in order to better understand technical means of the present disclosure; and in order to make above and other objects, features and advantages of the present disclosure more obvious and understandable, detailed description of the present disclosure is particularly provided in the following.

BRIEF DESCRIPTION OF THE DRAWINGS

In order to explain the embodiments of the present disclosure or the technical scheme in the related art more clearly, the drawings required in the description of the embodiments or the prior art will be briefly introduced below; obviously, the drawings in the following description are only some embodiments of the present disclosure, and other drawings can be obtained according to these drawings by those of ordinary skill in the art without paying creative labor.

DETAILED DESCRIPTION OF THE EMBODIMENTS

Figure 1:
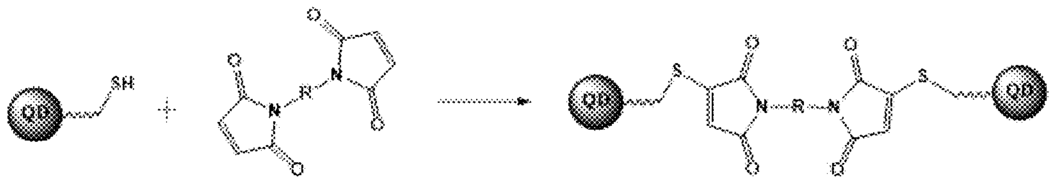
FIG. 1 is a schematic diagram of an interaction principle between a ligand coordinated on a surface of a quantum dot body and a reactive compound according to an embodiment of the present disclosure.

In the following, the technical scheme in the embodiment of the disclosure will be described clearly and completely in connection with the drawings; obviously, the described embodiment is intended to be only a part of the embodiment of the disclosure, but not all of them. On a basis of the embodiments in the present disclosure, all other embodiments obtained by the ordinary skilled in the art without any creative effort should be within a protection scope of the present disclosure.

Unless the context requires otherwise, a term "including" is constructed as an open and inclusive meaning, that is, "including, but not limited to" throughout the specification and claims. In description of the specification, terms "one embodiment", "some embodiments", "an exemplary embodiment", "an example", "a specific example" or "some examples" are intended to indicate that a specific feature, structure, material or characteristic related to this embodiment or example is included in at least one of embodiments or examples of the present disclosure. Schematic representations of the above terms do not necessarily refer to a same embodiment or example. Furthermore, the specific features, structures, materials or characteristics described may be included in any one or more of the embodiments or examples in any suitable way.

In the related art, a quantum dot film is usually prepared by inkjet printing to meet patterning requirements of the quantum dot film in a preparation process of a display product. In the related art, a process of preparing the quantum dot film by inkjet printing is as follows. A solute (quantum dot material) is dispersed in a solvent to form a uniform quantum dot solution, which is sprayed in a pixel pit of a substrate by an inkjet printing device, and then drying treatment is performed to remove the solvent, so that the solute in the quantum dot solution can automatically deposited into a film so as to form the quantum dot film.

However, since the solute (the quantum dot material) in the quantum dot solution is formed into the film in a drying process, and the quantum dot solution in the pixel pit has such effects as the coffee-ring effect, climbing effect and Marangoni effect. Thus, the quantum dot film formed after the solute is automatically deposited into the film has a severely uneven film thickness phenomenon, which affects display effect of a display substrate made of the quantum dot film and reduces product quality.

On this basis, a quantum dot ink is provided in an embodiment of the disclosure, which includes a first ink and a second ink. The first ink includes at least a quantum dot body and a ligand coordinated on a surface of the quantum dot body. The ligand includes an R1 group.

The second ink includes at least a reactive compound, and the reactive compound is configured for being capable of interacting with the R1 group and cause the quantum dot body to deposit to form a film.

In an exemplary embodiment, the quantum dot body can include a combination of one or more of cadmium sulfide (CdS), cadmium selenide (CdSe), zinc selenide (ZnSe), indium phosphide (InP), lead sulfide (PbS), cesium lead chloride ($CsPbCl_3$), cesium lead bromide ($CsPbBr_3$), cesium lead iodide ($CsPbI_3$), and cadmium sulfide/zinc sulfide (CdS/ZnS), cadmium selenide/zinc sulfide (CdSe/ZnS), indium phosphide/zinc sulfide (InP/ZnS), lead sulfide/zinc sulfide (PbS/ZnS), cesium lead chloride/zinc sulfide ($CsPbCl_3$/ZnS), cesium lead bromide/zinc sulfide ($CsPbBr_3$/ZnS), (cesium lead iodine/zinc sulfide) $CsPbI_3$/ZnS, or other quantum dot systems.

In an exemplary embodiment, with surface treatment of the quantum dot body, the quantum dot body is coordinated with the ligand, and the ligand is wrapped on a surface of the quantum dot body to protect the quantum dot body and promote the quantum dot body to be better dispersed in the first ink.

The R1 group in the ligand can be a functional group with certain reactivity, or it can also be a group with positive charges or negative charges.

In an exemplary embodiment, the reactive compound may be a reactive monomer capable of cross-linking with the R1 group, or it may be a compound with positive charges or negative charges, which are opposite to charges on the R1 group.

In some embodiments, the first ink further includes a first solvent and the second ink further includes a second solvent. A product after interaction between the reactive compound and the R1 group is coordinated on the quantum dot body, and the product is insoluble in the first solvent and the second solvent.

It should be noted that, in a practical application, if the product after the interaction between the reactive compound and the R1 group is dissolved in one of the first solvent or the second solvent, extraction will occur, and the original insoluble product will be re-dissolved, and deposition cannot be automatically made and the film cannot be formed.

Illustratively, the product after the interaction between the reactive compound and the R1 group may be a macromolecular diamide compound, or it may also be a macromolecular maleimide compound. At least two quantum dot bodies are bridged together by the macromolecular diamide compound or the macromolecular maleimide compound.

In the quantum dot ink according to the embodiment of the present disclosure, because the R1 group in the first ink can interact with the reactive compound in the second ink, when the second ink is added into the first ink, the R1 group can contact with the reactive compound and interact with each other to form a new substance which is coordinated on the surface of the quantum dot body and is insoluble in the first solvent and the second solvent. In an actual interaction process, with increased interaction time, solubility of the new substance gradually decreases, and the new substance and the quantum dot body deposit to a bottom layer of the mixed ink to form a wet film. When the solvent is removed by drying treatment, there may be little chance for the quantum dot body to emerge the Marangoni effect, coffee-ring effect or climbing phenomenon, so that the quantum dot film formed by the quantum dot ink has good film-forming uniformity, and further display effect of the display product prepared by the quantum dot film is improved.

In the present disclosure, a main reason for the product after the interaction between the reactive compound and R1 group not being insoluble in the first solvent and the second solvent is solubility decrease caused by increasing of molecular weight of the product and/or solubility decrease caused by difference between polarity of the product and polarities of the first solvent and the second solvent.

In some embodiments, the molecular weight of the product is greater than the molecular weight of the reactive compound.

In the practical application, with increase of the molecular weight of the product, the solubility of the product in the first solvent and the second solvent gradually decreases. With the product being coordinated on the quantum dot body, the new substance and the quantum dot body deposit together to the bottom layer of the mixed ink to form the wet film. When the solvent is removed by drying treatment, there may be little chance for the quantum dot body to emerge the Marangoni effect, coffee-ring effect or climbing phenomenon, so that the quantum dot film formed by the quantum dot ink has good film-forming uniformity, and further display effect of the display product prepared by the quantum dot film is improved.

In some embodiments, the molecular weight of the product may also be greater than that of the ligand.

In an exemplary embodiment, the product after the interaction is insoluble in the first solvent and the second solvent due to increase of the molecular weight, and thus automatically deposits to form the film.

In some embodiments, the polarity of the product is different from that of the first solvent, and is also different from that of the second solvent.

Illustratively, if the product is a polar molecule and the first solvent and the second solvent are non-polar solvents, the product is insoluble in the non-polar solvents, and the product automatically deposits due to decrease of the solubility, and thus forms the film together with the quantum dot body.

Alternatively, if the product is a non-polar molecule and the first solvent and the second solvent are polar solvents, the product is insoluble in the polar solvents, and the product automatically deposits due to decrease of the solubility, and thus forms the film together with the quantum dot body.

In some embodiments, the polarity of the product may be the same as those of the first solvent and the second solvent, in which case the product may be insoluble in the first solvent and the second solvent due to the increase of the molecular weight, and thus automatically deposits to form the film.

In some embodiments, the interaction between the reactive compound and the R1 group can include at least following three situations.

Firstly, a cross-linking reaction takes place between the reactive compound and the R1 group, so that the reactive compound and the ligand with the R1 group together form a macromolecular polymer which is insoluble in the first solvent and the second solvent and has a network structure, a chain structure or a star structure, and the macromolecular polymer is coordinated on the quantum dot body.

Secondly, there is electrostatic adsorption between the reactive compound and the R1 group, that is, the reactive compound carries positive charges and the R1 group carries negative charges. With the electrostatic adsorption, the reactive compound and the ligand with the R1 group form aggregates insoluble in the first solvent and the second solvent through electrostatic self-assembly.

Alternatively, the compound carries negative charges and the R1 group carries positive charges, and with the electrostatic adsorption, the reactive compound and the ligand with the R1 group form aggregates insoluble in the first solvent and the second solvent through electrostatic self-assembly.

Thirdly, hydrogen bonds can be formed between the reactive compound and the R1 group. With the hydrogen bonds, the reactive compound and the ligand with the R1 group self-assemble to form a supramolecular structure insoluble in the first solvent and the second solvent. At this point, the R1 group may include hydrogen (H) atoms with strong polar bonds, and the reactive compound may include fluorine (F), oxygen (O) and nitrogen (N) atoms with electronegativity. Supramolecular refers to an organized aggregate composed of two or more molecules by intermolecular interaction.

Of course, the interaction between the reactive compound and the R1 group can also include other types. When the reactive compound can interact with the R1 group and make the quantum dot body deposit to form the film, the interaction between them is not limited herein.

In an exemplary embodiment, the first ink and the second ink may further include other components such as a viscosity modifier, a dispersant, a surfactant, or the like.

An emitted color of the quantum dot thin film prepared by the above quantum dot ink is not limited herein. In the practical application, the emitted colors of the quantum dot thin film can be varied according to different structures of the quantum dot body, different ligands wrapped on the surface of the quantum dot and different reactive compounds coordinated with the R1 group in the ligand.

In some embodiments, the polarities of the first solvent and the second solvent are different.

In an exemplary embodiment, the first solvent is a non-polar solvent and the second solvent is a polar solvent.

Illustratively, the non-polar solvent includes a mixture of cyclohexane and tetradecane.

Illustratively, the polar solvent includes a mixture of acetone, chloroform, toluene and N-methylpyrrolidone; or, the polar solvent includes a mixture of diethylene glycol, triethylene glycol, diethylene glycol dimethyl ether, dimethyl sulfoxide and dimethylformamide.

In an exemplary embodiment, the solvents of the first ink and the second ink are different in polarity, and the first ink includes the non-polar solvent, and the second ink includes the polar solvent. With the quantum dot body coordinated with the ligand on its surface being dispersed in the non-polar solvent and the reactive compound being dispersed in the polar solvent, when the first ink is mixed with the second ink, the interaction between the ligand with the R1 group and the reactive compound can only occur near an interface of the polar solvent and the non-polar solvent since the polar solvent is immiscible with the non-polar solvent, and the product after the interaction between them is insoluble in the first solvent and the second solvent due to its high molecular weight, and thus it automatically deposits to form the film. Quantum dot bodies coordinated with the ligand and reactive compounds which are not located at the interface move toward the interface, and the reaction is gradually completed with the increase of time. In this way, on one hand, because the interaction takes place near the interface of the polar solvent and the non-polar solvent, a reaction rate between them can be well controlled, extent of the reaction can be improved, a deposition rate of the product can be controlled, and the film-forming uniformity can be improved. On the other hand, in the drying process, it is difficult for the solvent to cause the product to flow after interaction, thus avoiding a problem of uneven film formation.

It should be noted that, whether the polarities of the solvents of the first ink and the second ink are the same or opposite, the product after the interaction between the quantum dot body coordinated with the ligand and the reactive compound can automatically deposit to form the film because of its insolubility in the first solvent and the second solvent due to the large molecular weight. In addition, it should be noted again that when the polarities of the solvents of the first ink and the second ink are the same, and the polarity of the product after the interaction between the quantum dot body coordinated with the ligand and the reactive compound is different from those of the solvents of the first ink and the second ink, the product cannot be dissolved in the solvents of the first ink and the second ink, so that the product automatically deposits to form the film.

In some embodiments, the R1 group may include a group with a sulfhydryl group (—SH) or a group with an amino group (—$NH_2$).

In some embodiments, the reactive compound may include a polymaleimide compound or polysuccinimide compound.

Illustratively, the polymaleimide compound includes a bismaleimide compound or a trimaleimide compound; and the polysuccinimide compound include a bissuccinimide compound or a trisuccinimide compound.

In an exemplary embodiment, when the R1 group includes the group with the sulfhydryl group (—SH) and the reactive compound includes the polymaleimide compound, a cross-linking reaction occurs between the group with the sulfhydryl (—SH) and the polymaleimide compound, thereby forming a macromolecular compound with a network structure, a chain structure or a star structure, which can be coordinated on the quantum dot body and bridges at least two quantum dot bodies together.

In an exemplary embodiment, when the R1 group includes the group with the amino group (—$NH_2$) and the reactive compound includes the polymaleimide compound, a cross-linking reaction may occur between the group with the amino group (—$NH_2$) and the polysuccinimide compound, thereby forming a macromolecular compound with a network structure, a chain structure or a star structure, which can be coordinated on the quantum dot body and bridges at least two quantum dot bodies together.

In some embodiments, the bismaleimide compound include bismaleimide propane

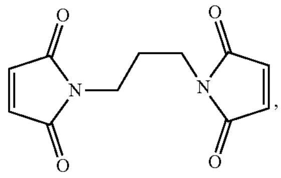 [SMILES: O=C1C=CC(=O)N1CCCN1C(=O)C=CC1=O]
, bismaleimide butane

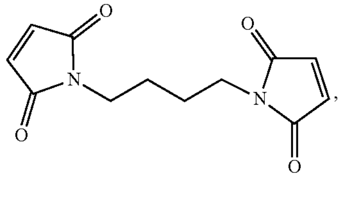 [SMILES: O=C1C=CC(=O)N1CCCCN1C(=O)C=CC1=O]
, bismaleimide hexane

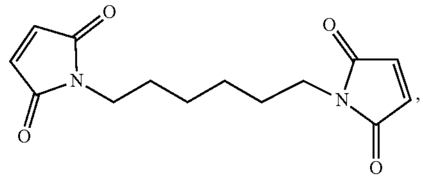
,

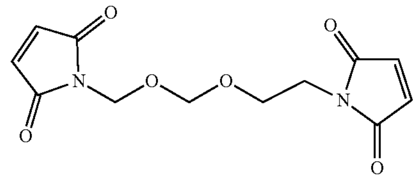
or

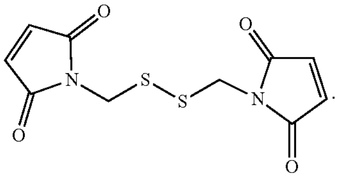
.

The trimaleimide compound includes tris(2-maleimidoethyl)amine

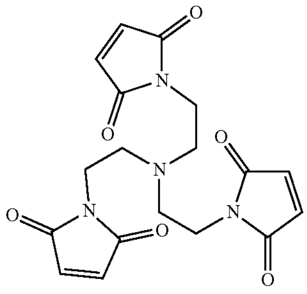
.

In some embodiments, the bissuccinimide compound include disuccinimidyl glutarate

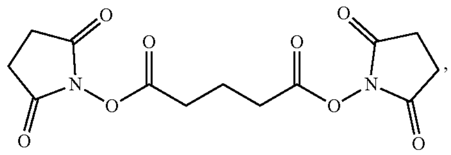 [SMILES: O=C(CCCC(=O)ON1C(=O)CCC1=O)ON1C(=O)CCC1=O]
, disuccinimidyl pimelate

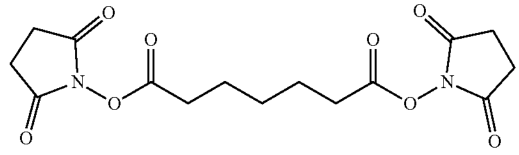
,

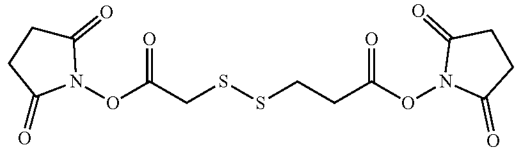
or

-continued

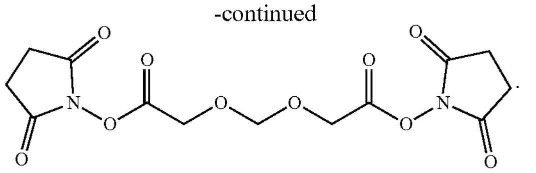

The trisuccinimide compound includes tris-(succinimidyl) aminotriacetate.

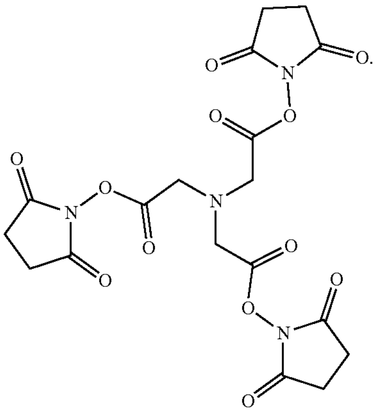 [SMILES: O=C(CN(CC(=O)ON1C(=O)CCC1=O)CC(=O)ON1C(=O)CCC1=O)ON1C(=O)CCC1=O]

In some embodiments, when the R1 group includes the group with the sulfhydryl group, the reactive compound includes the polymaleimide compound, and the solvent of the second ink includes acetone, chloroform, toluene and N-methylpyrrolidone.

In the case where the reactive compound includes the polymaleimide compound, acetone, chloroform, toluene and N-methylpyrrolidone can be selected as the solvent of the second ink, which can better dissolve and disperse the reactive compound, thus ensuring a stable reaction between the reactive compound and the quantum dot body coordinated with the ligand.

In some embodiments, when the R1 group includes the group with the amino group, the reactive compound includes the polysuccinimide compound, and the solvent of the second ink includes a combination of at least two of diethylene glycol, triethylene glycol, diethylene glycol dimethyl ether, dimethyl sulfoxide and dimethylformamide.

In some embodiments, the product coordinated on the quantum dot body includes:

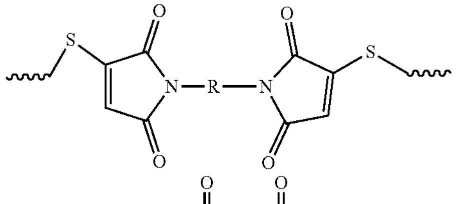

or

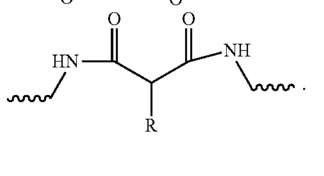

In an exemplary embodiment, when the R1 group on the surface of the quantum dot is a sulfhydryl group and the reactive compound includes the bismaleimide compound, a cross-linking mechanism of the two groups is shown in FIG. 1. After two quantum dot molecules with sulfhydryl groups cross-link with a bismaleimide compound to generate macromolecular maleimide substance, which bridges the two quantum dot molecules together.

Figure 2:
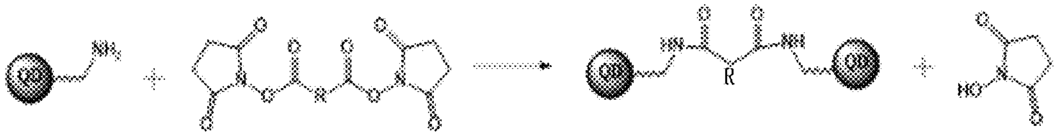
FIG. 2 is a schematic diagram of an interaction principle between another ligand coordinated on a surface of a quantum dot body and a reactive compound according to an embodiment of the present disclosure.
Figure 3:
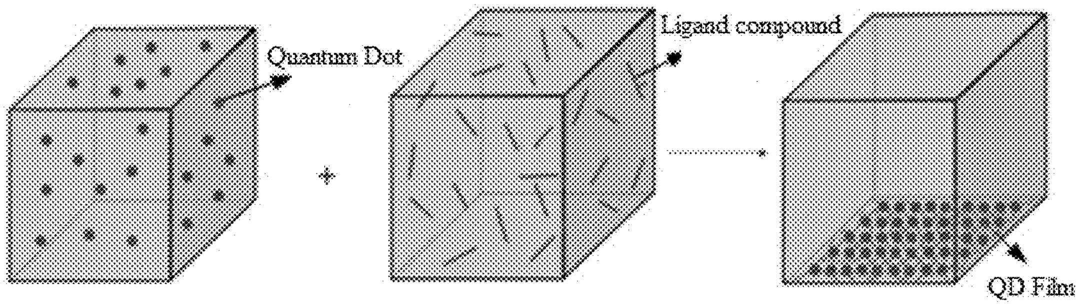
FIG. 3 is a schematic diagram of a forming process of a quantum dot film prepared by a first ink and a second ink according to an embodiment of the present disclosure.

In an exemplary embodiment, when the R1 group on the surface of the quantum dot is the amino group, and the reactive compound includes the bissuccinimide compound, a crosslinking mechanism of the two groups is shown in FIG. 2. Two amino groups on two quantum dot molecules respectively react with two ester groups on a bissuccinimide compound molecule to generate macromolecular bisamide substance, which bridges the two quantum dot molecules together.

In some embodiments, a concentration of quantum dots in the first ink ranges from 5 to 40 mg/mL.

In an embodiment of the disclosure, by controlling the concentration of the quantum dots in a range of 5 to 40 mg/mL, it is possible to ensure that the quantum dots can be well dispersed in the first ink, thereby improving the film-forming uniformity of the quantum dot film prepared by the first ink and improving luminous effect of the quantum dot film.

Illustratively, as shown in Table 1, the R1 group includes groups with sulfhydryl groups, and the solvent of the first ink includes a mixture of cyclohexane and tetradecane, with a volume of the cyclohexane accounting for 30% to 50% of a total volume of the first ink and a volume of the tetradecane accounting for 40% to 60% of the total volume of the first ink. The reactive compound in the second ink includes the polymaleimide compound, and a concentration of the reactive compound in the second ink ranges from 1 to 20 mg/mL, the solvent of the second ink include acetone, chloroform, toluene and N-methylpyrrolidone, with a volume of the acetone accounting for 10 to 20% of the total volume of the second ink, a volume of the chloroform accounting for 10 to 20% of the total volume of the second ink, a volume of the toluene accounting for 30 to 50% of the total volume of the second ink and a volume of the N-methylpyrolidone accounting for 30 to 40% of the total volume of the second ink.

Illustratively, as shown in Table 2, the R1 group includes groups with amino groups, and the solvent of the first ink includes a mixture of cyclohexane and tetradecane, with a volume of the cyclohexane accounting for 30% to 50% of a total volume of the first ink and a volume of the tetradecane accounting for 40% to 60% of the total volume of the first ink. The reactive compound in the second ink includes the polysuccinimide compound, and a concentration of the reactive compound in the second ink ranges from 1 to 20 mg/mL. The solvent of the second ink includes a mixture of diethylene glycol, triethylene glycol, diethylene glycol dimethyl ether, dimethyl sulfoxide and dimethylformamide, with a volume of the diethylene glycol accounting for 10 to 20% the total volume of the second ink, a volume of triethylene glycol accounting for 30 to 40% the total volume of the second ink, a volume of diethylene glycol dimethyl ether accounting for 10 to 20% the total volume of the second ink, and a volume of dimethyl sulfoxide accounting for 30 to 40% of the total volume of the second ink.

TABLE 1

Component Example of a Quantum Dot Ink

| | First ink | | | Second ink | | | | |
|---|---|---|---|---|---|---|---|---|
| | First solvent | | First Solute | Second solvent | | | | Second Solute |
| Material | Cyclohexane | Tetradecane | Quantum Dot with Ligand with Sulfhydryl Group | Acetone | Chloroform | Toluene | N-methylpyrrolidone | Polymaleimide Compound |
| Content | 30-50% | 40-60% | 5-40 mg/mL | 10-20% | 10-20% | 30-50% | 30-40% | 1-20 mg/mL |

TABLE 2

Component Example of Another Quantum Dot Ink

| | First ink | | | Second ink | | | | | |
|---|---|---|---|---|---|---|---|---|---|
| | First solvent | | First Solute | Second solvent | | | | | Second Solute |
| Material | Cyclohexane | Tetradecane | Quantum Dot with Ligand with Amino Group | diethylene glycol | triethylene glycol | diethylene glycol dimethyl ether | dimethyl sulfoxide | dimethylformamide | Polymaleimide Compound |
| Content | 30-50% | 40-60% | 5-40 mg/mL | 10-20% | 30-40% | 10-20% | 30-40% | 10-20% | 1-20 mg/mL |

It should be noted that by changing composition ratios of the solvents in the first ink and the second ink, surface tensions, viscosity coefficients and boiling points of the first ink and the second ink can be adjusted to meet requirements of an inkjet printing process.

A quantum dot film is further provided in an embodiment of the present disclosure, which includes the quantum dot body in the quantum dot ink as described above and a product after interaction between the R1 group and the reactive compound. The product is coordinated on at least a part of the quantum dot body.

The above product can be a macromolecular polymer with a network structure, a chain structure or a star structure; or an aggregate formed by electrostatic self-assembly of the reactive compound and the ligand with the R1 group; or a supramolecule formed by self-assembly of the reactive compound and the ligand with the R1 group for hydrogen bonding.

In the practical application, most of products in quantum dot films are coordinated on the quantum dot body, and there are a very small number of products free around the quantum dot body.

In some embodiments, the quantum dot film also includes reactive compounds that have not reacted completely and ligands that have not reacted completely and coordinate on the surface of the quantum dot body.

Contents of the reactive compounds that have not reacted completely and the ligands that have not reacted completely and coordinate on the surface of the quantum dot body are very small in the quantum dot film. By adjusting a ratio of the first ink to the second ink, extent of the reaction can be improved, and the contents of the reactive compounds that have not reacted completely and the ligands that have not reacted completely and coordinate on the surface of the quantum dot body can be reduced.

In the embodiment of the disclosure, since the quantum dot with the R1 group on its surface in the first ink can interact with the reactive compound in the second ink, when the second ink is added into the first ink, the R1 group can contact with the reactive compound and interact with each other to form a new substance which is coordinated on the surface of the quantum dot body and is insoluble in the first solvent and the second solvent. In an actual interaction process, with increasing interaction time, solubility of the new substance gradually decreases, and the new substance and the quantum dot body deposit together to a bottom layer of the mixed ink to form a wet film. When the solvent is removed by drying treatment, there may be little chance for the quantum dot body to emerge the Marangoni effect, coffee-ring effect or climbing phenomenon, so that the quantum dot film formed by the quantum dot ink has good film-forming uniformity, and further display effect of the display product prepared by the quantum dot film is improved.

In addition, because there is the reactive compound in the quantum dot ink that can interact with the ligand with the R1 group, after the quantum dot film is formed, the product in the quantum dot film formed by the ligand and the reactive compound can improve film compactness of the quantum dot film, thus improving anti-solvent performance of the quantum dot film and effectively reducing possible damage of solvents in subsequent processes to the quantum dot film.

A display substrate is provided in an embodiment of the present disclosure, which includes the quantum dot film as described above.

The display substrate also includes a plurality of pixel pits arranged in an array, each of the pixel pits is provided with the quantum dot film.

The display substrate can be an Organic Light-Emitting Diode (OLED) display substrate, a Mini LED or Micro LED display substrate, which can be determined according to actual situation.

In the embodiment of the disclosure, due to high film-forming quality and uniform thickness of the quantum dot film, respective sub-pixels in the display substrate prepared by the quantum dot film emit light uniformly, and display effect of the display substrate is good.

In addition, when the display substrate prepared by using the quantum dot film according to the embodiment of the disclosure displays, a problem of uneven pixel brightness caused by uneven thickness of the quantum dot film and also breakdown and leakage problems caused by the uneven thickness are avoided, due to uneven thickness of the quantum dot film.

Figure 4:
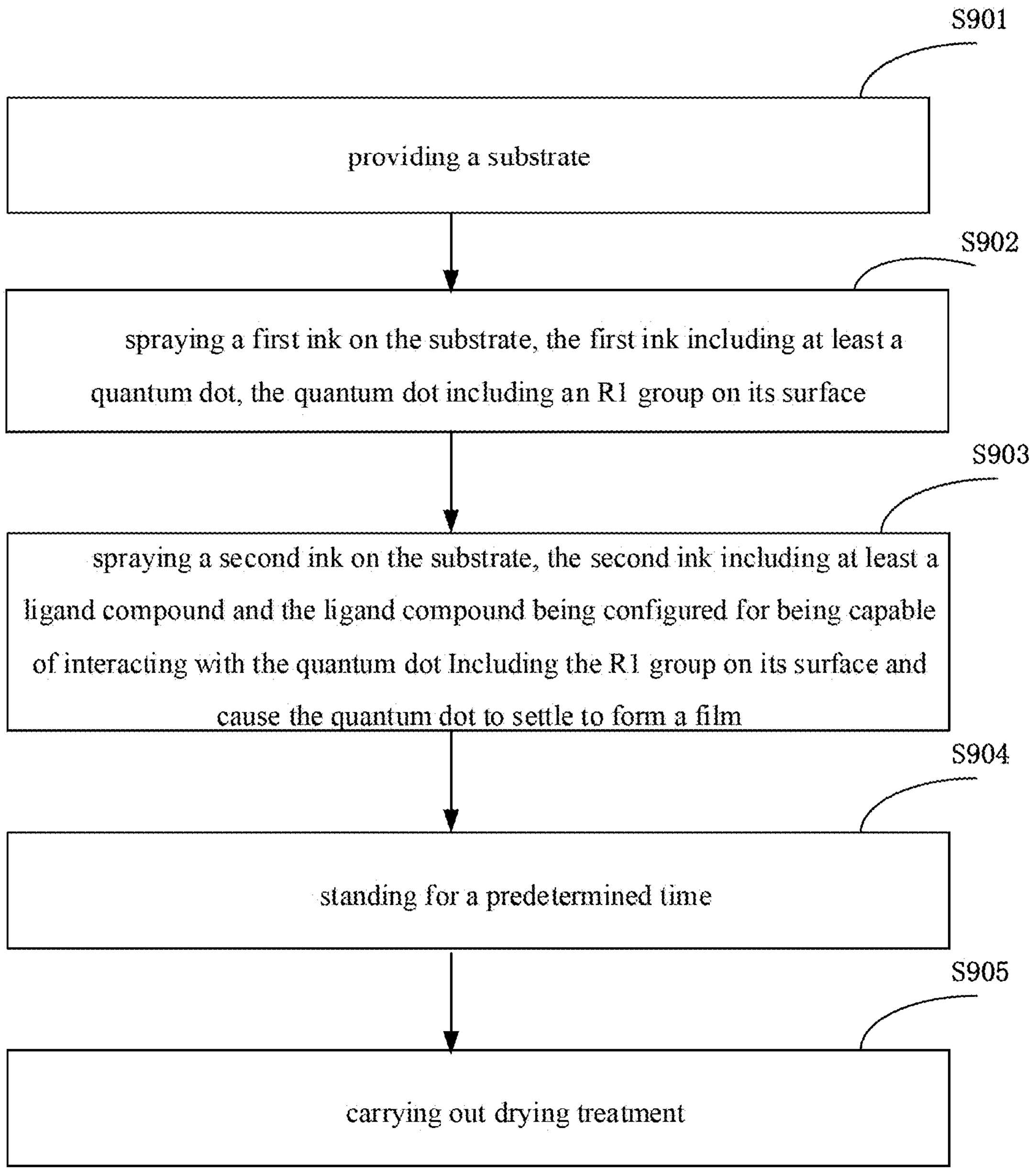
FIG. 4 is a flowchart of a preparation process of a quantum dot film according to an embodiment of the present disclosure.

A method for preparing a quantum dot film is further provided in an embodiment of the disclosure, which includes following steps S901 to S905 as referred to FIG. 4.

In S901, a substrate is provided.

A specific structure of the substrate is not limited herein. Illustratively, the substrate may be a driving substrate or a glass substrate, depending on actual requirements.

In S902, a first ink is sprayed on the substrate, and the first ink includes at least a quantum dot body and a ligand coordinated on a surface of the quantum dot body. The ligand includes an R1 group.

In a practical application, before the first ink is sprayed on the substrate, the substrate can be cleaned and dried, on which a hole injection (HI) layer and a hole transport (HT) layer will be formed.

The hole injection layer is obtained through spraying of an ink of a hole injection layer material with an inkjet printing process, drying treatment and a film detection process.

The hole transport layer is obtained through spraying of an ink of a hole transport layer material with an inkjet printing process, drying treatment and a film detection process.

In S903, a second ink is sprayed on the substrate, and the second ink includes at least a reactive compound, and the reactive compound is configured for being capable of interacting with the R1 group and cause the quantum dot body to deposit to form the film.

Because the R1 group in the first ink can interact with the reactive compound in the second ink, when the second ink is mixed with the first ink, the R1 group can contact with the reactive compound and interact with each other to form a new substance which is coordinated on the surface of the quantum dot body and deposits to a bottom layer of the mixed ink with the quantum dot body to form a wet film. When the solvent is removed by drying treatment, there may be little chance for the quantum dot body to emerge the Marangoni effect, coffee-ring effect or climbing phenomenon, so that the quantum dot film formed by the quantum dot ink has good film-forming uniformity, and further display effect of the display product prepared from the quantum dot film is improved.

In S904, standing is performed for a predetermined time.

With standing for the predetermined time, the ligand with the R1 group in the first ink can fully contact and react with the reactive compound in the second ink. Illustratively, the predetermined time may be 30 min.

Of course, the predetermined time can also be determined according to specific types of the R1 group and the reactive compound, a concentration of the ligand with the R1 group in the first ink, and a concentration of the reactive compound in the second ink, which is not specifically limited herein.

In S905, drying treatment is carried out.

After the R1 group in the first ink fully contacts and reacts with the reactive compound in the second ink, the product of interaction in the mixed solution composed of the first ink and the second ink has deposited down to form the wet film, which is dried to form the quantum dot film.

Before the drying treatment, the quantum dots have uniformly formed into the wet film. During a drying process, microscopic movement of solute molecules in the quantum dot ink is very small, which makes the solute spread evenly on the substrate to form the film and alleviates the coffee-ring effect, climbing effect and Marangoni effect to a great extent, thus improving flatness of the quantum dot film and forming a quantum dot film with high uniformity.

In the practical application, after the quantum dot film is formed, an electron transport layer (ET), a cathode and an encapsulation layer will be sequentially formed on the quantum dot film, in which the electron transport layer is prepared by inkjet printing and the cathode is prepared by vacuum evaporation.

A material of the cathode can be a metal material, such as aluminum (Al) or silver (Ag).

It should be noted that preparation methods of other films except the quantum dot film can refer to related art, which is not limited herein.

In some embodiments, the first ink further includes a first solvent, and the second ink further includes a second solvent.

A product after interaction between the reactive compound and the R1 group is coordinated on the quantum dot body, and the product is insoluble in the first solvent and the second solvent.

It should be noted that, in a practical application, if the product after the interaction between the reactive compound and the R1 group is dissolved in one of the first solvent or the second solvent, extraction will occur, and the original insoluble product will be re-dissolved, and deposition cannot be made and the film cannot be formed.

Illustratively, the product after the interaction between the reactive compound and the R1 group may be a macromolecular diamide compound, or it may also be a macromolecular maleimide compound. At least two quantum dot bodies are bridged together by the macromolecular diamide compound or the macromolecular maleimide compound.

In the quantum dot ink according to the embodiment of the present disclosure, because the R1 group in the first ink can interact with the reactive compound in the second ink, when the second ink is added into the first ink, the R1 group can contact with the reactive compound and interact with each other to form a new substance which is coordinated on the surface of the quantum dot body and is insoluble in the first solvent and the second solvent. In an actual interaction process, with increasing interaction time, solubility of the new substance gradually decreases, and the new substance and the quantum dot body deposit to a bottom layer of the mixed ink to form a wet film. When the solvent is removed by drying treatment, there may be little chance for the quantum dot body to emerge the Marangoni effect, coffee-ring effect or climbing phenomenon, so that the quantum dot film formed by the quantum dot ink has good film-forming uniformity, and further display effect of the display product prepared from the quantum dot film is improved.

In the present disclosure, a main reason for the product after the interaction between the reactive compound and R1 group not being insoluble in the first solvent and the second solvent is solubility decrease caused by increasing of molecular weight of the product and/or solubility decrease caused by difference between polarity of the product and polarities of the first solvent and the second solvent.

In some embodiments, the molecular weight of the product is greater than that of the reactive compound.

In some embodiments, the molecular weight of the product is greater than that of the reactive compound.

In the practical application, with increase of the molecular weight of the product, the solubility of the product in the first solvent and the second solvent gradually decreases. With the product being coordinated on the quantum dot body, the new substance and the quantum dot body deposit to the bottom layer of the mixed ink to form the wet film. When the solvent is removed by drying treatment, there may be little chance for the quantum dot body to emerge the Marangoni effect, coffee-ring effect or climbing phenomenon, so that the quantum dot film formed by the quantum dot ink has good film-forming uniformity, and further display effect of the display product prepared from the quantum dot film is improved.

In some embodiments, the molecular weight of the product may also be greater than that of the ligand.

In an exemplary embodiment, the product after the interaction is insoluble in the first solvent and the second solvent due to increase of the molecular weight, and thus automatically deposits to form the film.

In some embodiments, the polarity of the product is different from that of the first solvent, and is also different from that of the second solvent.

Illustratively, if the product is a polar molecule and the first solvent and the second solvent are non-polar solvents, the product is insoluble in the non-polar solvents, and the product automatically deposits due to decrease of the solubility, and thus forms the film together with the quantum dot body.

Alternatively, if the product is a non-polar molecule and the first solvent and the second solvent are polar solvents, the product is insoluble in the polar solvents, and the product automatically deposits due to decrease of the solubility, and thus forms the film together with the quantum dot body.

In some embodiments, the polarity of the product may be the same as those of the first solvent and the second solvent, in which case the product may be insoluble in the first solvent and the second solvent due to the increase of the molecular weight, and thus automatically deposits to form the film.

In some embodiments, the interaction between the reactive compound and the R1 group can include at least following three situations.

Firstly, a cross-linking reaction takes place between the reactive compound and the R1 group, so that the reactive compound and the ligand with the R1 group together form a macromolecular polymer which is insoluble in the first solvent and the second solvent and has a network structure, a chain structure or a star structure, and the macromolecular polymer is coordinated on the quantum dot body.

Secondly, there is electrostatic adsorption between the reactive compound and the R1 group, that is, the reactive compound carries positive charges and the R1 group carries negative charges. With the electrostatic adsorption, the reactive compound and the ligand with the R1 group form aggregates insoluble in the first solvent and the second solvent through electrostatic self-assembly.

Alternatively, the compound carries negative charges and the R1 group carries positive charges, and with the electrostatic adsorption, the reactive compound and the ligand with the R1 group form aggregates insoluble in the first solvent and the second solvent through electrostatic self-assembly.

Thirdly, hydrogen bonds can be formed between the reactive compound and the R1 group. With the hydrogen bonds, the reactive compound and the ligand with the R1 group self-assemble to form a supramolecular structure insoluble in the first solvent and the second solvent. At this point, the R1 group may include hydrogen (H) atoms with strong polar bonds, and the reactive compound may include fluorine (F), oxygen (O) and nitrogen (N) atoms with electronegativity. Supramolecular refers to an organized aggregate composed of two or more molecules by intermolecular interaction.

Of course, the interaction between the reactive compound and the R1 group can also include other types. When the reactive compound can interact with the R1 group and make the quantum dot body deposit to form the film, the interaction between them is not limited herein.

In some embodiments, the polarity of the first solvent and the polarity of the second solvent are different.

In an exemplary embodiment, the first solvent is a non-polar solvent and the second solvent is a polar solvent.

Illustratively, the non-polar solvent includes a mixture of cyclohexane and tetradecane.

Illustratively, the polar solvent includes a mixture of acetone, chloroform, toluene and N-methylpyrrolidone; or, the polar solvent includes a mixture of diethylene glycol, triethylene glycol, diethylene glycol dimethyl ether, dimethyl sulfoxide and dimethylfomamide.

In an exemplary embodiment, the solvents of the first ink and the second ink are different in polarity, and the first ink includes the non-polar solvent, and the second ink includes the polar solvent. With the quantum dot body coordinated with the ligand on its surface being dispersed in the non-polar solvent and the reactive compound being dispersed in the polar solvent, when the first ink is mixed with the second ink, the interaction between the ligand with the R1 group and the reactive compound can only occur near an interface of the polar solvent and the non-polar solvent since the polar solvent is immiscible with the non-polar solvent, and the product after the interaction between them is insoluble in the first solvent and the second solvent due to its high molecular weight, and thus it automatically deposits to form the film. Quantum dot bodies coordinated with the ligand and reactive compounds which are not located at the interface move toward the interface, and the reaction is gradually completed with the increase of time. In this way, on one hand, because the interaction takes place near the interface of the polar solvent and the non-polar solvent, a reaction rate between them can be well controlled, extent of the reaction can be improved, a deposition rate of the product can be controlled, and the film-forming uniformity can be improved. On the other hand, in the drying process, it is difficult for the solvent to cause the product to flow after interaction, thus avoiding a problem of uneven film formation.

The above is only specific embodiments of the present disclosure, but a protection scope of the present disclosure is not limited to this, and any change or substitution which occurs to any person familiar with this technical field within the technical scope disclosed by the present disclosure should be encompassed within the protection scope of the present disclosure. Therefore, a protection scope of the present disclosure shall be subject to a protection scope of the claims.

The invention claimed is:

1. A quantum dot ink, comprising:

a first ink including at least a quantum dot body and a ligand coordinated on a surface of the quantum dot body, the ligand including an R1 group; and a second ink including at least a reactive compound, the reactive compound being configured for being capable of interacting with the R1 group and cause the quantum dot body to deposit to form a film;

wherein the first ink further includes a first solvent and the second ink further includes a second solvent; wherein a product after interaction between the reactive compound and the R1 group is coordinated on the quantum dot body, and the product is insoluble in the first solvent and the second solvent.

2. The quantum dot ink according to claim 1, wherein a molecular weight of the product is larger than a molecular weight of the reactive compound.

3. The quantum dot ink according to claim 1, wherein a polarity of the product is different from a polarity of the first solvent, and the polarity of the product is further different from a polarity of the second solvent.

4. The quantum dot ink according to claim 1, wherein interaction between the reactive compound and the R1 group includes one of cross-linking reaction, electrostatic adsorption and hydrogen bonding.

5. The quantum dot ink according to claim 1, wherein the polarity of the first solvent is different from the polarity of the second solvent.

6. The quantum dot ink according to claim 1, wherein the R1 group includes a group with a sulfhydryl group or a group with an amino group.

7. The quantum dot ink according to claim 1, wherein the reactive compound includes a polymaleimide compound or polysuccinimide compound.

8. The quantum dot ink according to claim 7, wherein the polymaleimide compound includes a bismaleimide compound or a trimaleimide compound; and the polysuccinimide compound include a bissuccinimide compound or a trisuccinimide compound.

9. The quantum dot ink according to claim 8, wherein the bismaleimide compound includes:

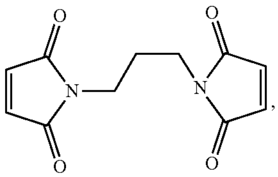

,

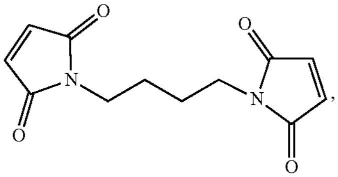

,

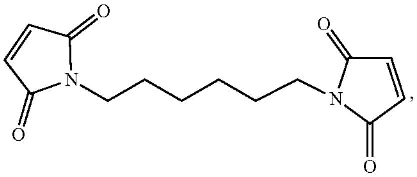

,

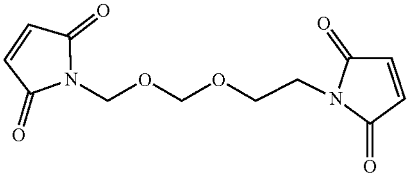

or

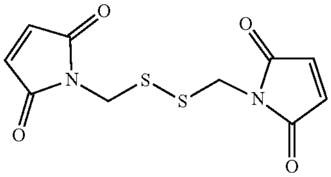

;

the trimaleimide compound includes:

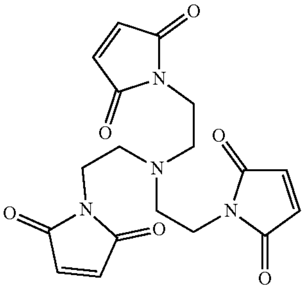

;

the bissuccinimide compound includes:

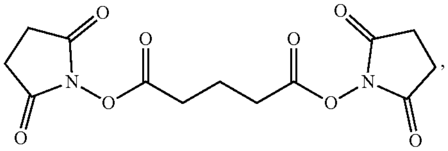

,

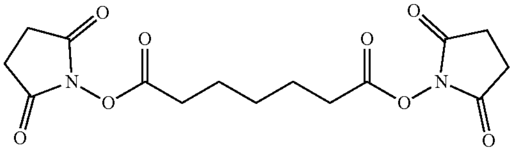

,

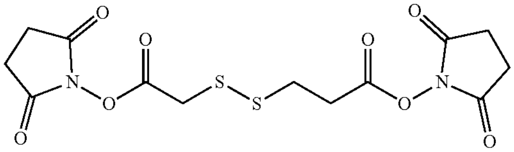

or

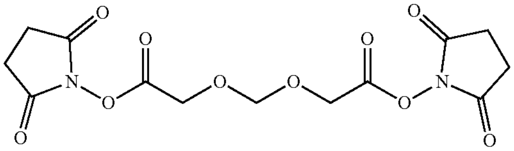

;

and the trisuccinimide compound includes:

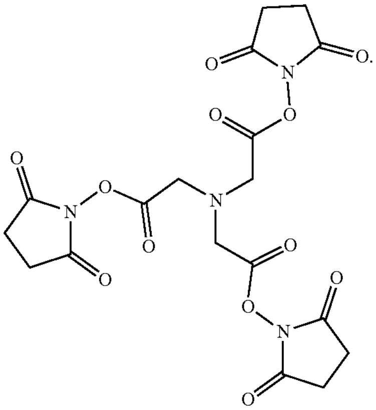 [SMILES: O=C(CN(CC(=O)ON1C(=O)CCC1=O)CC(=O)ON1C(=O)CCC1=O)ON1C(=O)CCC1=O]

.

10. The quantum dot ink according to claim 1, wherein when the R1 group includes a group with a sulfhydryl group, the reactive compound includes a polymaleimide compound, and the second solvent includes acetone, chloroform, toluene and N-methylpyrrolidone; and when the R1 group includes a group with an amino group, the reactive compound includes a polysuccinimide compound, and the second solvent includes diethylene glycol, triethylene glycol, diethylene glycol dimethyl ether, dimethyl sulfoxide and dimethylformamide.

11. The quantum dot ink according to claim 1, wherein the product coordinated on the quantum dot body includes:

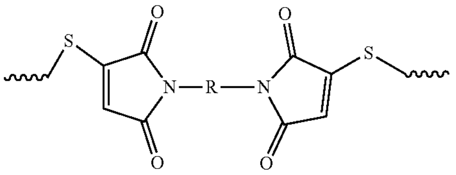

or

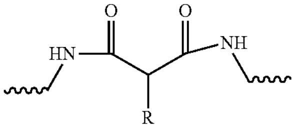

.

12. A quantum dot film, comprising the quantum dot body in the quantum dot ink according to claim 1, and a product after interaction between the R1 group and the reactive compound, the product being coordinated on at least a part of the quantum dot body.

13. The quantum dot film according to claim 12, further comprising the reactive compound and the ligand coordinated on the surface of the quantum dot body.

14. A display substrate, comprising the quantum dot film according to claim 12.

15. A method for preparing a quantum dot film, comprising:

providing a substrate;

spraying a first ink on the substrate, the first ink including at least a quantum dot body and a ligand coordinated on a surface of the quantum dot body, the ligand including an R1 group;

spraying a second ink on the substrate, the second ink including at least a reactive compound and the reactive compound being configured for being capable of interacting with the R1 group and cause the quantum dot body to deposit to form the film;

standing for a predetermined time; and carrying out drying treatment;

wherein the first ink further includes a first solvent and the second ink further includes a second solvent; wherein a product after interaction between the reactive compound and the R1 group is coordinated on the quantum dot body, and the product is insoluble in the first solvent and the second solvent.

16. The method for preparing the quantum dot film according to claim 15, wherein a molecular weight of the product is larger than a molecular weight of the reactive compound.

17. The method for preparing the quantum dot film according to claim 15, wherein a polarity of the product is different from a polarity of the first solvent, and the polarity of the product is further different from a polarity of the second solvent.

18. The method for preparing the quantum dot film according to claim 15, wherein interaction between the reactive compound and the R1 group includes one of cross-linking reaction, electrostatic adsorption and hydrogen bonding.

* * * * *